Dec. 5, 1961 W. V. DORP 3,011,622
SHEET METAL EDGING MACHINES
Filed Feb. 3, 1958

Inventor:
Walter v. Dorp
By his attorneys
Howson and Howson

United States Patent Office 3,011,622
Patented Dec. 5, 1961

3,011,622
SHEET METAL EDGING MACHINES
Walter v. Dorp, Rheydt, Germany, assignor to Mannesmann-Meer Aktiengesellschaft, M.-Gladbach, Germany
Filed Feb. 3, 1958, Ser. No. 712,870
Claims priority, application Germany Feb. 15, 1957
1 Claim. (Cl. 198—165)

This invention relates to sheet metal edging machines. More particularly it is concerned with a conveyor mechanism for such machines.

The method of making steel tubes by bending strips and sheets and welding along a longitudinal seam is becoming more and more popular. Whilst smaller tubes are made by continuously shaping the flat strip with the aid of a number of consecutive pairs of rollers to form slotted tubes, this method cannot be applied for large tubes. Only the bending over of the edges of the sheet is effected by rollers and the curving of the sheets, in individual lengths, is effected in several hydraulic pressing stages by means of suitable tools. The requirement in both cases however, is that the sheets, whether as strips from the collar or sheets from the length of a tube, be given a width corresponding to the periphery of the finished tube by squaring the two edges of the sheet which are to be brought together. For very large tubes the edges are often shaped by planing in order to facilitate a good seam weld.

For the purpose of squaring, planing and bending-over the marginal portions of the sheets so called edging machines are used which carry out these three steps during a single pass of the sheet. The sheet is carried through the machine by pairs of rubber-coated superposed driven rollers. The pairs of driving rollers are not distributed evenly across the machine but are arranged in groups between which the edging means are located. The upper driving rollers and their driving mechanisms are carried in a traverse the height which can be adjusted according to the thickness of the sheet to be carried. In the sheet conveying means referred to above the sheet is held and conveyed at only a few points and the conveying surface is very small compared to the total area of the sheet. The result is that uneven forces act on the edges of the sheet transverse to the direction in which it is conveyed during squaring, planing and bending-over (there being no conveyor rollers at these points) which are liable to displace the sheet laterally, especially at the beginning causing the sheet to be carried obliquely through the machine. This leads to inaccurate working operations being carried out.

It is the object of the invention to overcome the disadvantages referred to above.

It is a further object of the present invention to provide a conveyor mechanism for a sheet metal edging machine wherein the sheet is conveyed by endless chains, driven in the same direction at the same speed, arranged above and below the sheet and wherein means are provided for adjusting the height of the upper chain or chains above the lower chain or chains so as to enable the conveyor to accommodate various thicknesses of sheet.

It is still a further object of the invention to enhance the gripping of the sheet by the chains by providing the links of the chain on their working faces with cushions of rubber or similar material.

It is yet a further object of the invention to provide guides along the length of the machine which guide rollers upon which the chains are supported so as to prevent lateral displacement of the chains.

An example of a conveyor in accordance with the invention will now be described with reference to the accompanying drawings in which.

The chains in the lower portion of the machine are designated 1 and those in the upper portion 2. The upper portion, which is in the form of a traverse 3, is adjustable for height.

Figure 1:
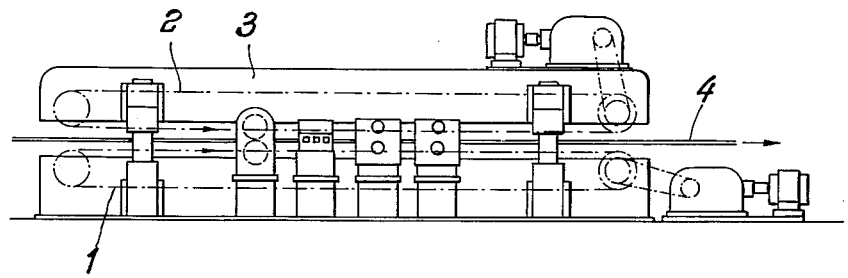
FIGURE 1 is a diagrammatic lengthwise view of the whole conveyor.
Figure 2:
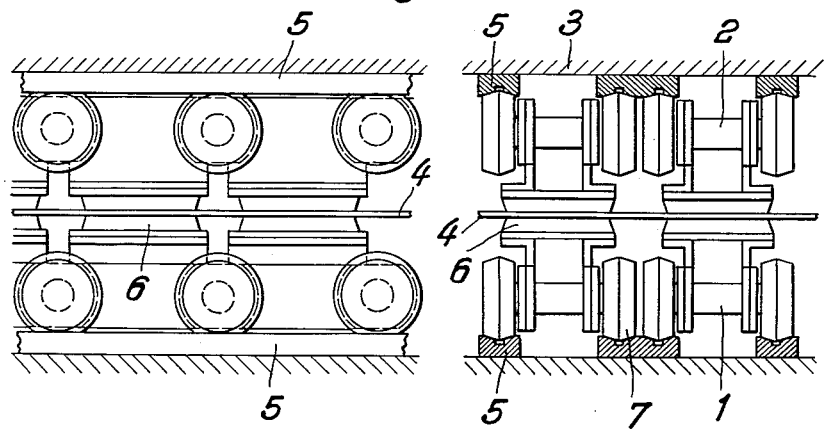
FIGURE 2 shows to a larger scale the arrangement or construction of the chains.

The chains 1 and 2 are carried on double conical supporting rollers 7 (FIGURE 2) which run in V-shaped guides 5. The chains are thus constrained from movement laterally to the direction of movement of the sheet.

In order that the sheet 4 may be firmly gripped by the chains rubber cushions 6 are provided on their working faces which engage the sheet.

The advantages of this conveyor mechanism described above as compared with a conveyor using rollers are threefold. Firstly, the conveying surface is considerably larger and thus the specific surface pressure is much lower. Secondly, the sheet is held and conveyed continuously along all its path through the machine and thirdly lateral displacements of the sheet by forces acting transversely to the direction of conveying is avoided in that the chains are guided laterally along their whole length. By suitably constructing the supporting rollers, lateral pressures cause the sheet to be clamped more tightly between the upper and lower chains and thereby deflection from the direction of movement is avoided.

I claim:

Sheet metal edge-trimming machine particularly for large sheets of metal that are to be bent into tubes and welded lengthwise, in which there is a conveyor comprising upper and lower endless transporting chains moving at equal speed and adapted to grip the metal sheet between them and to move it in the direction of the longitudinal axis of the sheet, mechanism for adjusting the height of the upper chains relative to the lower to allow for different thicknesses of metal sheets and means adapted to produce automatic counteracting forces to any force tending to move the metal sheet out of a straight path, said means comprising a combination of rollers on the chains having double conical faces, V-shaped guides which are engaged by the conical faces of the rollers and rows of rubber cushions on the chains adapted to grip the faces of the metal sheet; whereby wedging pressure from the V-shaped guides and the rubber cushions increases the pressure holding the sheets straight when any force tries to move the sheet out of a straight line.

References Cited in the file of this patent
UNITED STATES PATENTS

| | | |
|---|---|---|
| 336,050 | Jacobs | Feb. 9, 1896 |
| 561,830 | Stanley | June 9, 1896 |
| 1,181,771 | Kauffeld | May 2, 1916 |
| 2,166,776 | Von Hofe et al. | July 18, 1939 |
| 2,679,924 | Powell | June 1, 1954 |

FOREIGN PATENTS

| | | |
|---|---|---|
| 872,726 | Germany | Apr. 2, 1953 |